United States Patent [19]
Kim et al.

[11] Patent Number: 5,513,155
[45] Date of Patent: Apr. 30, 1996

[54] CAV-TYPE OPTICAL DISK PLAYER HAVING A PAUSE FUNCTION

[75] Inventors: Young H. Kim, Suwon; Young K. Byun, Anyang, both of Rep. of Korea

[73] Assignee: Samsung Electronics Co., Ltd., Kyungki-Do, Rep. of Korea

[21] Appl. No.: 227,013

[22] Filed: Apr. 13, 1994

[30] Foreign Application Priority Data

Apr. 13, 1993 [KR] Rep. of Korea .................... 1993-6128

[51] Int. Cl.$^6$ ................................. G11B 17/22
[52] U.S. Cl. ......................... 369/32; 369/33; 369/44.28
[58] Field of Search ................................. 369/32, 33, 54, 369/55, 47, 48, 58, 44.28, 44.29; 360/10.1, 11.1, 27; 358/342, 340, 312, 313

[56] References Cited

U.S. PATENT DOCUMENTS

| | | | |
|---|---|---|---|
| 4,878,129 | 10/1989 | Yasuda et al. | 360/10.1 |
| 4,894,814 | 1/1990 | Yamada et al. | 369/32 |
| 5,323,367 | 6/1994 | Tamura et al. | 369/32 |
| 5,337,295 | 8/1994 | Maeda | 369/32 |

Primary Examiner—Georgia Y. Epps
Assistant Examiner—Tan Dinh
Attorney, Agent, or Firm—Sughrue, Mion, Zinn, Macpeak & Seas

[57] ABSTRACT

A laser disk player performs a pause operation using a frequency generation (FG) pulse, frame address data read out from a disk and a vertical sync signal. A memory stores the frame address data read out at the time when a pause key signal is inputted. A microprocessor controls the pickup to jump back one track to the previous track and compares the currently read-out frame address data with the frame address data stored in the memory, to check the operation state of the frequency generator. If it is judged that the frequency generator for generating the FG pulse is operating abnormally, the microprocessor receives a vertical sync signal and controls the one-track jump operation of the pickup until the frame address data at a time of the pause is larger than or is equal to the frame address data read out via the one-track jumped pickup. Thus, the laser disk player performs a pause function reliably even if the frequency generator for generating the FG pulse operates abnormally.

16 Claims, 4 Drawing Sheets

CAV-TYPE OPTICAL DISK PLAYER HAVING A PAUSE FUNCTION

BACKGROUND OF THE INVENTION

The present invention relates to an optical disk player, and more particularly, to a pause performing method capable of accurately and reliably performing a pause operation even if a frequency generator which detects rotation of a disk operates abnormally, and the apparatus therefor.

Generally, laser disk players are classified into constant linear velocity (CLV) systems and constant angular velocity (CAV) systems, according to the method used for recording information on the laser disk.

If a pause key is actuated while reproducing information from a laser disk, the CLV system is controlled so that a blue picture is displayed, while the CAV system is controlled so that a still picture is displayed.

FIG. 1 is a block diagram showing a conventional laser disk player having a pause function. FIG. 2 is a flowchart diagram for explaining a pause function for a conventional CAV system which is controlled by a microprocessor 15 of the FIG. 1 apparatus.

A disk drive motor 10 rotates a disk 12 which is loaded on a loader 11 under the control of microprocessor 15. A pickup unit 13 moves from the innermost track to the outermost track on a surface of disk 12 to read out image and audio signals which are recorded by a digital method. Microprocessor 15 judges if a pause key is in an on-state (step 100). If a user turns on pause key PAUSE in a switch portion 14, microprocessor 15 receives a frequency generation (FG) pulse which is generated in a frequency generator 16 and applied through a waveform shaper 17. The microprocessor 15 then judges if disk 12 is rotated one time by disk drive motor 10 (step 102). This FG pulse is generated by frequency generator 16 for detecting the rotation of disk 12. If the number of the FG pulses corresponding to the one-time rotation of the disk is detected, microprocessor 15 controls pickup unit 13 so that the pickup is moved to the previous track jump by one track (step 104). Thus, the pickup returns to the track position corresponding to the location at which the pause key was first turned on. Microprocessor 15 then performs a temporary stop mode, that is, a pause function, until a new key input signal is input (step 106). That is, microprocessor 15 controls the respective units so that the pickup repeatedly jumps back one track after each rotation, so that continuous picture reproduction stops. As noted above, this control is based on the FG pulses detected by the microprocessor.

Such a conventional laser disk player does not accurately perform the pause function if the FG pulse representing rotation information of the disk from the frequency generator is not generated in a normal way.

SUMMARY OF THE INVENTION

Therefore, to solve the above problems, it is an object of the present invention to provide a pause performing method for an optical disk player which performs a pause function even though a frequency generator operates abnormally.

Thus, to accomplish this object of the present invention, there is provided a pause performing method for use in an optical disk player comprising the steps of:

a) storing first position information which represents a pause position when a pause operation is performed;

b) comparing the stored first position information with second position information read out via a pickup that moves relative to the disk in a reproduction direction, to provide a comparison result;

c) firstly reading out the second position information if a current position of the pickup does not pass the pause position of the disk according to the comparison result;

d) allowing the pickup to travel along the disk tracks according to the pickup reproduction direction until a number of vertical sync signals read out from the disk equals a predetermined number, if the current position of the pickup passes the pause position of the disk according to the comparison result;

e) jumping the pickup along a reproduction start direction by the predetermined number of the tracks to a jump destination if the number of vertical sync signals read out from the disk by the travel of the pickup equals a predetermined number;

f) secondly reading out the second position information while the pickup travels along the reproduction direction from the jump destination; and g) repeating the above steps (b) through (f) using the second position information read out by the above reading-out steps (c) and (f).

Another object of the present invention is to provide a pause performing method for use in an optical disk player, capable of detecting an operation state of a frequency generator which generates a frequency generation (FG) pulse. More specifically, it is an object to use the data read out from a disk and perform a pause function by using a sync signal read out from a disk if the frequency generator operates abnormally.

To accomplish this other object of the present invention, there is provided a pause performing method for use in an optical disk player having a rotation information generator for generating information corresponding to rotation of a disk comprising the steps of:

a) storing first position information which represents a pause position when a pause operation is performed;

b) firstly jumping the pickup along a reproduction start direction by a predetermined number of tracks using disk rotation information which is supplied from the rotation information generator;

c) comparing the stored first position information with second position information read out via a pickup;

d) firstly reading out the second position information if a current position of the pickup does not pass the pause position of the disk according to the comparison result;

e) allowing the pickup to travel along the disk tracks according to the pickup reproduction direction until a number of vertical sync signals read out from the disk equals a predetermined number, if the current position of the pickup passes the pause position of the disk according to the comparison result;

f) secondly jumping the pickup along the reproduction start direction by the predetermined number of tracks to a jump destination if the number of vertical sync signals read out from the disk by the travel of the pickup equals a predetermined number;

g) secondly reading out the second position information while the pickup travels along the reproduction direction from the jump destination; and h) repeating the above steps (c) through (g) using the second position information read out by the above reading-out steps (d) and (g).

A further object of the present invention is to provide a pause performing apparatus for use in an optical disk player capable of performing a pause function by using a sync signal read out from a disk if an abnormal operation state of a frequency generator is detected. According to the object, the pause function is performed by comparing the data read out from a disk with the data corresponding to a pause function start time.

The further object of the present invention can be accomplished by providing an optical disk player having a pause function comprising:

key input means having a pause key for outputting a pause key signal; a disk which stores a plurality of position information addresses different from one another and stores vertical sync signals; a pickup for reading data recorded on the disk; a memory for storing first position information read out from a pause position of the disk via the pickup at a time when the pause key signal is applied via the key input means; and control means for receiving the pause key signal from the key input means to control the memory to store the first position information, for controlling the pickup to travel on the track of the disk along the reproduction direction, for receiving the first position information stored in the memory and the second position information currently read out via the pickup, for judging if the current position passes the pause position, and for controlling the track jump of the pickup according to a result of the judgement.

DETAILED DESCRIPTION OF THE PREFERRED EMBODIMENTS

Preferred embodiments of the present invention will be described below in more detail with reference to the accompanying drawings.

Figure 1:
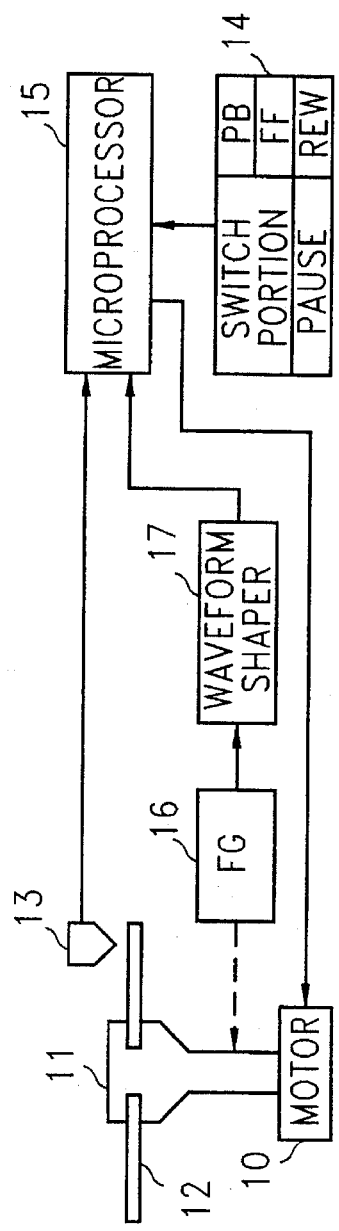
FIG. 1 is a block diagram showing a conventional laser disk player having a pause function.
Figure 3:
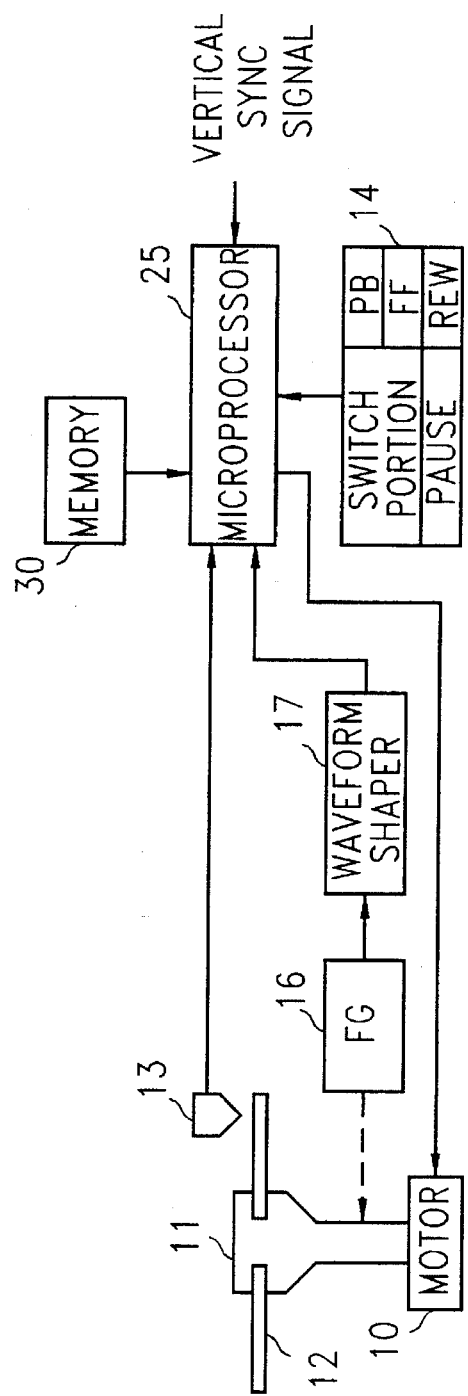
FIG. 3 is a block diagram showing a laser disk player capable of performing a pause function according to a preferred embodiment of the present invention.
Figure 2:
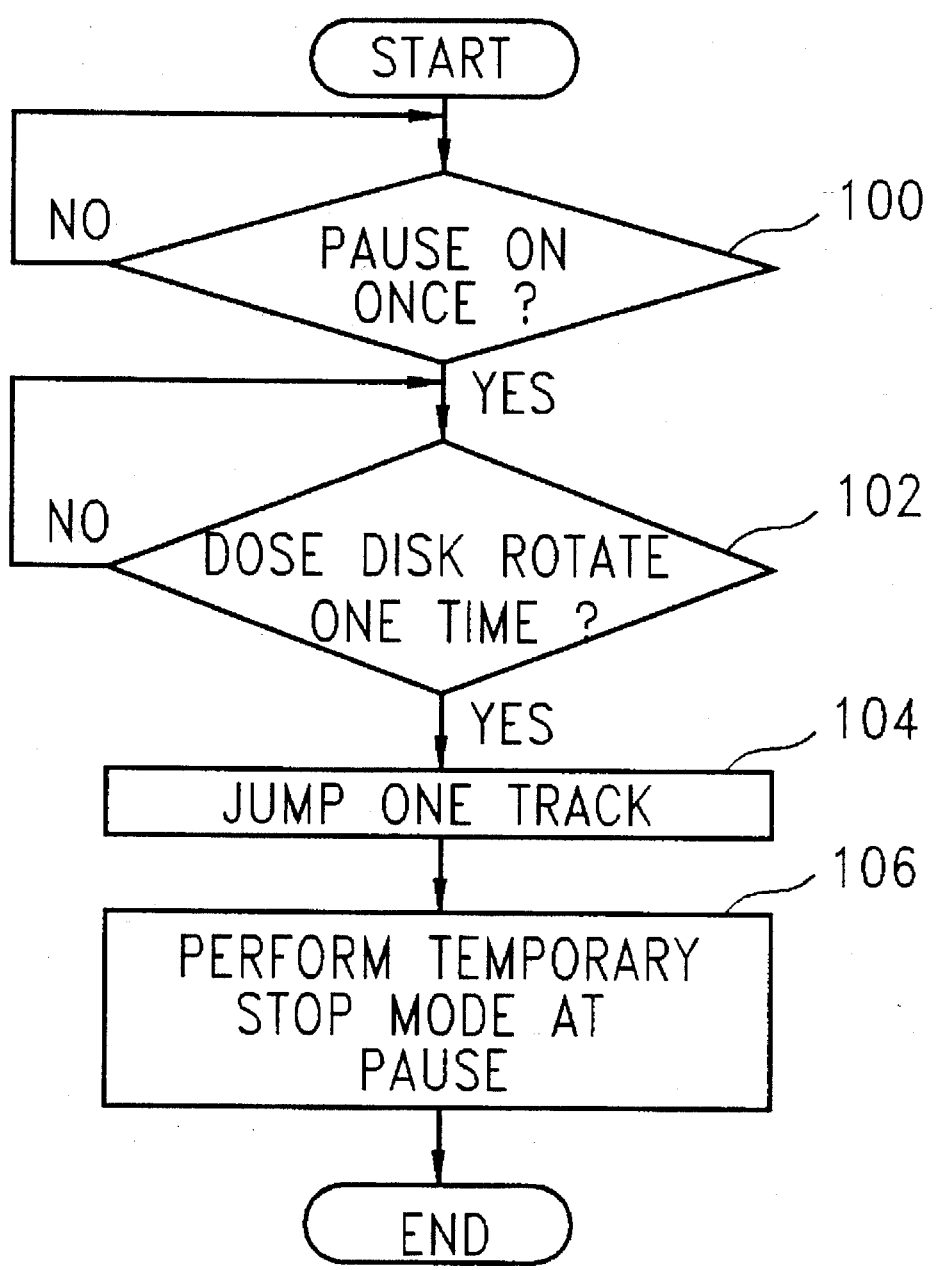
FIG. 2 is a flowchart diagram for explaining a pause function which is controlled by a microprocessor 15 of the FIG. 1 apparatus.

FIG. 3 is a block diagram showing a CAV type laser disk player capable of performing a pause function according to a preferred embodiment of the present invention. The FIG. 3 apparatus includes elements analogous to those shown in FIG. 1, as indicated by the use of same reference numerals, as well as a microprocessor 25 and a memory 30. The FIG. 3 elements having the same reference numerals as those of the FIG. 1 apparatus perform the same functions as those of the FIG. 1 elements. The FIG. 3 apparatus includes a loader 11 on which a disk is loaded and a disk drive motor 10 for rotating loader 11. In general, optical disks have position information formed as address signals, for searching recorded pictures and reproducing the recorded pictures. The position information includes chapter addresses, time address, frame addresses, etc. Disk 12 used in the embodiment of the present invention, has frame addresses. The frame address data is recorded so that the value of the frame address data increases as one proceeds from the innermost portion of disk 12 to the outermost portion thereof. Microprocessor 25 controls rotation of disk drive motor 10. Pickup unit 13 reads out and reproduces the image and audio signals digitally recorded on disk 12. Frequency generator 16 recognizes rotation of disk drive motor 10 and generates pulses corresponding to an amount of rotation. Waveform shaper 17 is connected between frequency generator 16 and microprocessor 25. Microprocessor 25 is connected to switch portion 14 to receive the user's key inputs. Microprocessor 25 receives vertical sync signals detected from a signals read out via pickup unit 13. Such a vertical sync signal detection is well-known to a person skilled in the art. Microprocessor 25 also controls the operation of pickup unit 13. The frame address data read out from disk 12 is stored in memory 30. Also, microprocessor 25 recognizes the rotation of disk drive motor 10 and controls the rotation of disk drive motor 10. Memory 30 stores the start frame address data of a pause function starting time read out from disk 12 by pickup unit 13. Microprocessor 25 then compares the frame address data currently read out from pickup unit 13 with the frame address data stored in memory 30. Also, microprocessor 25 detects an operation state of frequency generator 16 using the signal comparison result.

Figure 4:
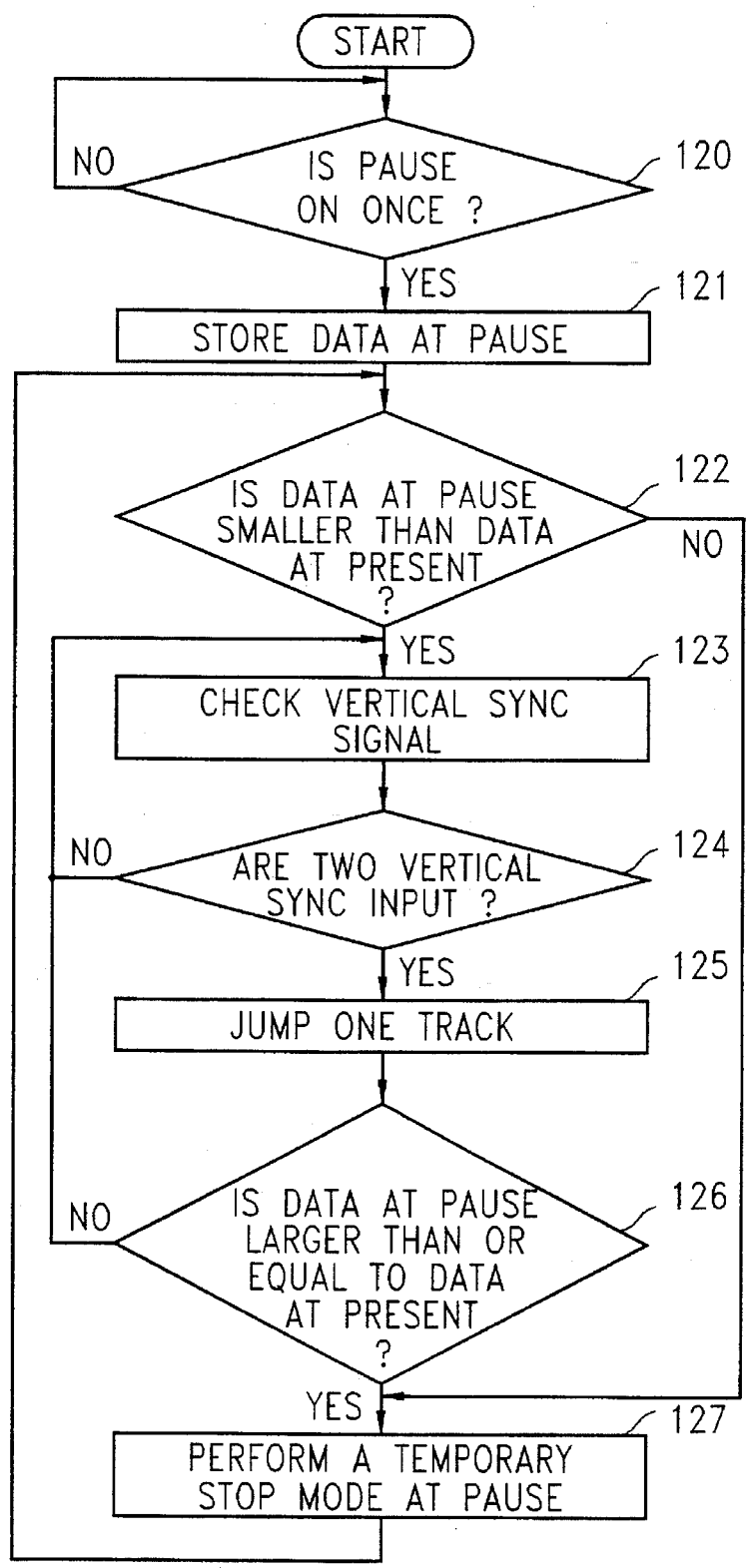
FIG. 4 is a flowchart diagram for explaining a microprocessor's function which is embodied by a preferred embodiment of the present invention.

FIG. 4 is a flowchart diagram for explaining the functioning of microprocessor 25 according to a preferred embodiment of the present invention. Pickup unit 13 continuously reads out the data stored in disk 12 under the control of microprocessor 25. Concurrently, microprocessor 25 continuously checks if a pause key PAUSE in switch portion 14 is switched to an on-state (step 120). If the user presses pause key PAUSE in switch portion 14, microprocessor 25 stores, in memory 30, the frame address data for the time when the pause function starts (step 121). Then, microprocessor 25 compares the frame address data currently read out via pickup unit 13 with the frame address data stored in memory 30 at time of the pause (step 122). If the frame address data at the time of the pause is smaller than the currently read-out frame address data, microprocessor 25 checks if a vertical sync signal read out from disk 12 is input (step 123). Microprocessor 25 then determined if two vertical sync signals have been input (step 124). The purpose of step 124 is to check if the current position of the pickup with respect to the disk is near the pickup position with respect to the disk at a moment when the pause function started. Thus, the number of the vertical sync signals used in step 124 is varied according to the amount of picture information recorded on a single track. If the two vertical sync signals are input, microprocessor 25 controls the pickup unit 13 to make the pickup jump back one track to the previous track (step 125). Then, if pickup unit 13 reads out new frame address data by the pickup's one track jump and supplies the read frame address data to microprocessor 25, microprocessor 25 compares the frame address data stored in memory 30 with the frame address data currently read out via pickup unit 13 (step 126). If the frame address data at a time of the pause is smaller than the currently read-out frame address data as a result of the comparison, microprocessor 25 returns to the signal processing of step 123. To the contrary, if, in either step 122 or step 126, the frame address data at a time of the pause is larger than or is equal to the currently read-out frame address data, microprocessor 25 performs a temporary stop mode. In the temporary stop mode, microprecessor 25 controls pickup unit 13 so that the pickup travels a given distance in the reproduction direction while the pickup reads out data recorded on the disk 12. Thus, based on the frame address data read out by the pickup, the pickup is forced to travel repeatedly along the same track in the pause mode (step 127). The control of microprocessor 25 is executed until a new key input signal is applied.

Figure 5:
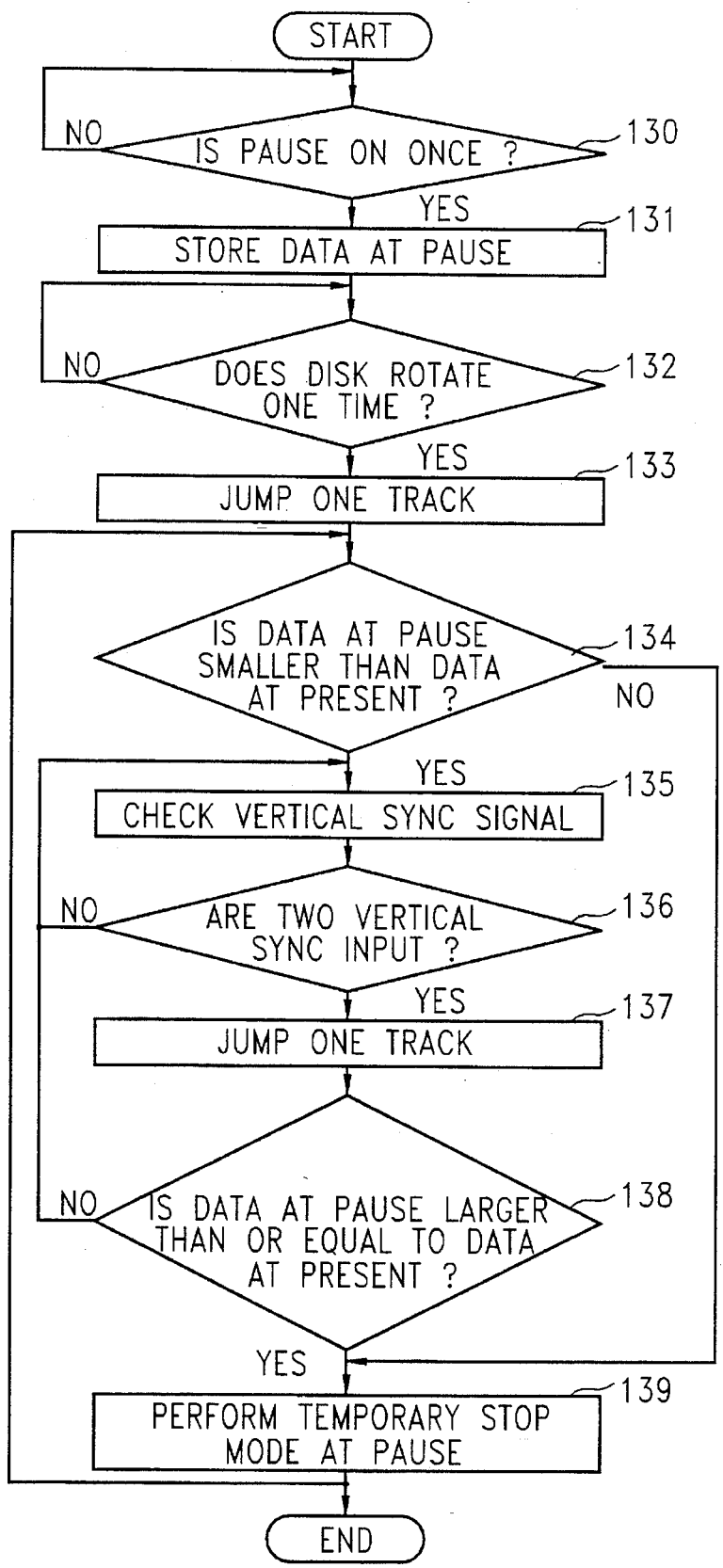
FIG. 5 is a flowchart diagram for explaining a microprocessor's function which is embodied by another preferred embodiment of the present invention.

FIG. 5 is a flowchart diagram for explaining the functioning of microprocessor 25 according to another preferred embodiment of the present invention. Microprocessor 25 continuously checks if a pause key PAUSE in switch portion 14 is switched to an on-state (step 130). If the user presses pause key PAUSE in switch portion 14, microprocessor 25 stores the frame address data at a time when a pause function starts. As in the previous embodiment, the address data is applied via pickup unit 13 and stored in memory 30 (step 131). Then, microprocessor 25 checks if the disk rotates one revolution, based on a frequency generation (FG) pulse which is input through waveform shaper 17 (step 132). If it is judged that the disk has rotated one revolution, microprocessor 25 controls pickup unit 13 to make the pickup jump back one track to the previous track (step 133). Microprocessor 25 reads out the frame address data at the time of the pause stored in memory 30 and compares it with the frame address data currently applied from pickup unit 13 (step 134). If the frame address data at the time of the pause is not smaller than the currently read-out frame address data, microprocessor 25 judges that frequency generator 16 is operating normally, and performs a temporary stop mode. In the temporary stop mode, microprocessor 25 controls pickup unit 13 so that the pickup, in repeated operations, travels a given distance along the disk in the reproduction direction and is then returned to the original "pause" position (step 139). On the other hand, if the frame address data at the time of the pause is smaller than the currently read-out frame address data, microprocessor 25 judges that frequency generator 16 is operating abnormally, and checks if a vertical sync signal detected from the currently read-out data is input (step 135). In case of a system using two vertical sync signals to store a single picture, microprocessor 25 judges if two vertical sync signals are inputted (step 136). If two vertical sync signals are input, microprocessor 25 controls pickup unit 13 to make the pickup jump back one track to the previous track to return to the initial position of the currently reproduced picture (step 137). If pickup unit 13 reads out new time data as a result of the one track jump, the read-out time is supplied to the microprocessor 25, and microprocessor 25 compares the frame address data at a time of the pause, stored in memory 30, with the frame address data currently read out via pickup unit 13 (step 138). If the frame address data at the time of the pause is smaller than the currently read-out time data as a result of the comparison, microprocessor 25 returns to step 135. To the contrary, if the frame address data at the time of the pause is larger than or is equal to the currently read-out frame address data, microprocessor 25 performs the same operation as that of step 127 of FIG. 4 (step 139). That is, microprocessor 25 performs the temporary stop mode controlling the pickup unit 13 so that the pickup, in repeated operations, travels a given distance along the disk in the reproduction direction and then is returned to the original "pause" position (step 139). While the pause function is performed, the still picture output at the time of the pause key input is displayed on a screen.

As described above, the laser disk player according to the present invention checks if the frequency generator for generating the FG pulse is operating abnormally, by comparing the disk address information at the time of the pause with the disk address information currently read out from the disk. If the frequency generator is operating abnormally, the pickup performs the track jump for the pause operation using the vertical sync signals read out from the disk. Accordingly, even if the frequency generator does not properly operate, the pause operation can be exactly performed.

What is claimed is:

1. A pause performing method for use in an optical disk player comprising the steps of:
    a) storing first position information which represents a pause position when a pause operation is performed;
    b) comparing the stored first position information with second position information read out via a pickup that moves relative to the disk in a reproduction direction, to provide a comparison result;
    c) firstly reading out the second position information if a current position of the pickup does not pass the pause position of the disk according to the comparison result;
    d) allowing the pickup to travel along the disk tracks according to the pickup reproduction direction until a number of vertical sync signals read out from the disk equals a predetermined number, if the current position of the pickup passes the pause position of the disk according to the comparison result;
    e) jumping the pickup along a reproduction start direction by a predetermined number of tracks to a jump destination if the number of vertical sync signals read out from the disk by the travel of the pickup equals a predetermined number;
    f) secondly reading out the second position information while the pickup travels along the reproduction direction from the jump destination; and
    g) repeating the above steps (b) through (f) using the second position information read out by the above reading-out steps (c) and (f) until a signal discontinuing the pause performing method is received.

2. A pause performing method according to claim 1, wherein said step f) reads out the second position information at a time when the pickup is moved by said track jump.

3. A pause performing method for use in an optical disk player having a rotation information generator for generating information corresponding to rotation of a disk comprising the steps of:
    a) storing first position information which represents a pause position when a pause operation is performed;
    b) firstly jumping the pickup along a reproduction start direction by a predetermined number of tracks using disk rotation information which is supplied from the rotation information generator;
    c) comparing the stored first position information with second position information read out via a pickup;
    d) firstly reading out the second position information if a current position of the pickup does not pass the pause position of the disk according to the comparison result;
    e) allowing the pickup to travel along the disk tracks according to the pickup reproduction direction until a number of vertical sync signals read out from the disk equals a predetermined number, if the current position of the pickup passes the pause position of the disk according to the comparison result;
    f) secondly jumping the pickup along the reproduction start direction by the predetermined number of the tracks to a jump destination if the number of vertical sync signals read out from the disk by the travel of the pickup equals a predetermined number;
    g) secondly reading out the second position information while the pickup travels along the reproduction direction from the jump destination; and h) repeating the above steps (c) through (g) using the second position information read out by the above reading-out steps (d) and (g) until a signal discontinuing the pause performing method is received.

4. A pause performing method according to claim 3, wherein said step b) comprises the steps of:

receiving the disk rotation information from said rotation information generator to judge if the disk has rotated a predetermined number of times; and jumping said pickup by the predetermined number of tracks in the reproduction start direction if said disk has rotated the predetermined number of times.

5. A pause performing method according to claim 3, wherein said step (g) reads out the second position information at a time when said pickup is moved by said jumping step.

6. An optical disk player having a pause function comprising:

key input means having a pause key for outputting a pause key signal;

a disk which stores a plurality of position information addresses different from one another and data recorded on the disk;

a pickup for reading the data recorded on the disk and the plurality of position information addresses;

a memory for storing a first one of the position information addresses as a first position information address read out from a pause position of the disk via the pickup at a time when the pause key signal is applied via the key input means; and control means for receiving the pause key signal from the key input means to control the memory to store the first position information address, for controlling the pickup to travel on the track of the disk along a reproduction direction, for receiving the first position information address stored in the memory and second position information address currently read out via the pickup and corresponding to a current position, for judging if the current position exceeds the pause position, and for controlling a track jump of the pickup according to a result of the judgement.

7. An optical disk player according to claim 6, wherein said disk stores the plurality of position information addresses which increase in value from an innermost portion of said disk to an outermost portion of said disk.

8. An optical disk player according to claim 7, wherein said disk additionally stores vertical sync signals and said control means comprises a microprocessor which operates according to the steps of:

a) checking if a value of the first position information address is smaller than a value of the second position information address by reading out the first position information address from the memory and comparing the first position information address with the second position information address;

b) checking if the number of the vertical sync signals, read out via the pickup, is equal to a predetermined number when the first position information address is smaller than the second position information address as a result of step (a); and c) controlling the pickup to continue travelling with the pickup jumped by the predetermined number of tracks in the reproduction start direction if the numbers are equal to each other as a result of step (b).

9. An optical disk player according to claim 8, further comprising a rotation information generator for generating information corresponding to rotation of the disk.

10. An optical disk player according to claim 9, wherein the operation of said microprocessor further comprises the steps of:

judging if said disk rotates by a predetermined number of revolutions according to the disk rotation information applied from said rotation information generator, thereby controlling the pickup to jump a predetermined number of tracks in the reproduction start direction if said disk rotates by the predetermined number of revolutions, and detecting the operation state of said rotation information generator using the second position information address read out through the jumped pickup and the first position information address.

11. A method of performing a pause function, for use in an optical disk player, comprising the steps of:

a) reading frame address data and vertical sync signals from an optical disk by controlling a pickup to move in a downstream direction during a reproduction operation;

b) responding to input of a pause signal by storing an initial current frame address in a memory, wherein the initial current frame address represents a desired pause location;

c) proceeding with the reproduction operation by reading the frame address data from the optical disk and comparing a subsequent current frame address with the initial current frame address stored in the memory;

d) if said comparing step yields a first comparison result indicating that the subsequent current frame address is smaller than the initial current frame address, controlling the optical pickup to jump back to an upstream track once a predetermined number of the vertical sync signals have been read from the disk, and again performing said comparing step; and e) if said comparing step yields a second comparison result indicating that the subsequent current frame address is not smaller than the initial current frame address, performing a temporary stop mode, to realize the pause function.

12. The method according to claim 11, wherein:

the first comparison result indicates that a current location of the pickup relative to the optical disk is downstream of the desired pause location.

13. The method according to claim 11, wherein:

the second comparison result indicates that a current location of the pickup relative to the optical disk is the same as or is upstream of the desired pause location.

14. A method of performing a pause function, for use in an optical disk player, comprising the steps of:

a) reading frame address data and vertical sync signals from an optical disk by controlling a pickup to move in a downstream direction during a reproduction operation;

b) reading frequency generation pulses indicative of rotation of the optical disk;

c) responding to input of a pause signal by storing an initial current frame address in a memory, wherein the initial current frame address represents a desired pause location;

d) controlling the pickup to jump back to an upstream track once a predetermined number of the frequency generation pulses have been read;

e) proceeding with the reproduction operation by reading the frame address data from the optical disk and comparing a subsequent current frame address with the initial current frame address stored in the memory;

f) if said comparing step yields a first comparison result indicating that the subsequent current frame address is smaller than the initial current frame address, controlling the optical pickup to jump back to an upstream track once a predetermined number of the vertical sync signals have been read from the disk, and again performing said comparing step; and g) if said comparing step yields a second comparison result indicating that the subsequent current frame address is not smaller than the initial current frame address, performing a temporary stop mode, to realize the pause function.

15. The method according to claim 14, wherein:

the first comparison result indicates that a current location of the pickup relative to the optical disk is downstream of the desired pause location.

16. The method according to claim 14, wherein:

the second comparison result indicates that a current location of the pickup relative to the optical disk is the same as or is upstream of the desired pause location.

* * * * *